United States Patent
Borens et al.

(10) Patent No.: US 8,999,091 B2
(45) Date of Patent: Apr. 7, 2015

(54) LAYER MATERIAL FOR HIGH-TEMPERATURE USE

(75) Inventors: Manfred Borens, Mainz (DE); Karsten von Westernhagen, Mainz (DE); Stefano Merolla, Mainz (DE)

(73) Assignee: Schott AG (DE)

( * ) Notice: Subject to any disclaimer, the term of this patent is extended or adjusted under 35 U.S.C. 154(b) by 1195 days.

(21) Appl. No.: 12/018,146

(22) Filed: Jan. 22, 2008

(65) Prior Publication Data

US 2008/0176054 A1 Jul. 24, 2008

(30) Foreign Application Priority Data

Jan. 23, 2007 (DE) .......................... 10 2007 004 243

(51) Int. Cl.
 *C03C 3/06* (2006.01)
 *C03C 4/20* (2006.01)
 (Continued)

(52) U.S. Cl.
 CPC .................. *C03C 3/06* (2013.01); *C04B 37/005* (2013.01); *C04B 2237/062* (2013.01); *C04B 2237/341* (2013.01); *C04B 2235/783* (2013.01);
 (Continued)

(58) Field of Classification Search
 CPC .... B32B 17/00; B32B 17/0064; B32B 18/00; B32B 37/00; B32B 37/24; C03B 29/02; C03B 19/02; C03B 19/06; C03B 20/00; C04B 2237/062; C04B 2237/341; C04B 2235/783; C04B 2235/95; C04B 2235/77; C04B 2235/65; C04B 2235/76; C04B 211/0025; C04B 2235/6027; C04B 14/06; C04B 14/22; C04B 35/14; C04B 35/64

USPC .................................. 156/305, 242; 428/220
 See application file for complete search history.

(56) References Cited

U.S. PATENT DOCUMENTS 1,531,265 A * 3/1925 Devers ........................ 174/50.61
3,189,337 A * 6/1965 North .............................. 266/77
(Continued)

FOREIGN PATENT DOCUMENTS

DE 69306169 T2 3/1997
DE 10244040 C1 12/2003
(Continued)

OTHER PUBLICATIONS

Kicevic et al., "A Statistical Analysis of the Influence of Processing Conditions on the Properties of Fused Silica", Journal of the European Ceramic Society, 16 (1996) 857-864.*
(Continued)

*Primary Examiner* — Alex Efta
(74) *Attorney, Agent, or Firm* — Kaplan Breyer Schwarz & Ottesen, LLP

(57) ABSTRACT

To provide a material for use at high temperatures of several 100° C. which is simple and quick to produce, the invention provides a composite having a layer structure and a process for producing it, which comprises the following steps:
 a) provision of at least two plates which each have at least one main area of extension,
 b) stacking of the plates in such a way that a main area of extension of one plate is essentially opposite a main area of extension of the subsequent plate in the stack,
 c) joining of the stacked plates to form a block using a sinterable composition,
 d) carrying out a heat treatment on the block so that at least sintering of the sinterable composition occurs and a strong composite body is formed from the block.

16 Claims, 9 Drawing Sheets

Figure 1:
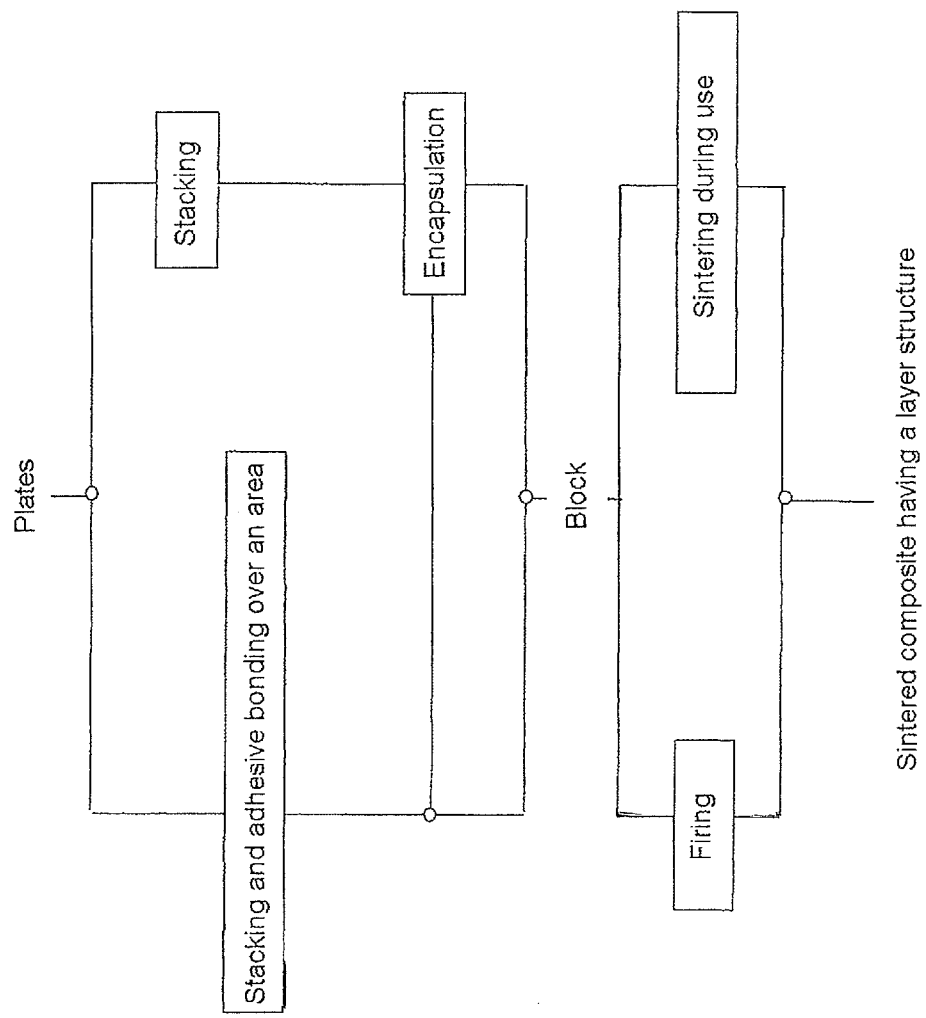

(51) Int. Cl.
*C03C 17/02* (2006.01)
*C03C 27/06* (2006.01)
*C04B 37/00* (2006.01)
*C04B 111/00* (2006.01)
*C04B 14/06* (2006.01)
*C04B 14/22* (2006.01)
*C04B 35/14* (2006.01)
*C04B 35/64* (2006.01)
*B32B 18/00* (2006.01)
*B32B 37/06* (2006.01)

(52) U.S. Cl.
CPC ......... *C04B2235/95* (2013.01); *C04B 2235/77* (2013.01); *C04B 2235/76* (2013.01); *C04B 2111/0025* (2013.01); *C04B 2235/6027* (2013.01); *C04B 14/06* (2013.01); *C04B 14/22* (2013.01); *C04B 35/14* (2013.01); *C04B 35/64* (2013.01); *B32B 18/00* (2013.01); *B32B 37/06* (2013.01); *Y10T 428/26* (2013.01); *Y10T 156/10* (2013.01); *C03C 4/20* (2013.01); *C03C 17/02* (2013.01); *C03C 27/06* (2013.01)

(56) References Cited

U.S. PATENT DOCUMENTS

| | | | | |
|---|---|---|---|---|
| 4,028,124 | A | * | 6/1977 | Bihuniak et al. ............... 501/126 |
| 4,297,309 | A | * | 10/1981 | North ............................ 264/667 |
| 4,506,025 | A | * | 3/1985 | Kleeb et al. ................... 501/124 |
| 4,929,579 | A | * | 5/1990 | Lassiter ........................ 501/133 |
| 5,389,591 | A | * | 2/1995 | Guigonis et al. .............. 501/133 |
| 5,617,262 | A | | 4/1997 | Ise et al. |
| 2006/0046075 | A1 | * | 3/2006 | Maul et al. ..................... 428/432 |

FOREIGN PATENT DOCUMENTS

| | | |
|---|---|---|
| DE | 102 43 954 B3 | 7/2004 |
| DE | 10 2004 054 392 A1 | 3/2006 |
| DE | 10 2005 025 796 A1 | 3/2006 |
| FR | 2291953 B | 11/1975 |
| JP | 56050146 | 7/1981 |

OTHER PUBLICATIONS

Oberfield's Inc., Concrete Masonry Product Guide, Copyright 2003, published Feb. 8, 2004. pp. 1-32.*
Oberfield's Inc., screenshot showing Feb. 8, 2004 publication date.*

* cited by examiner

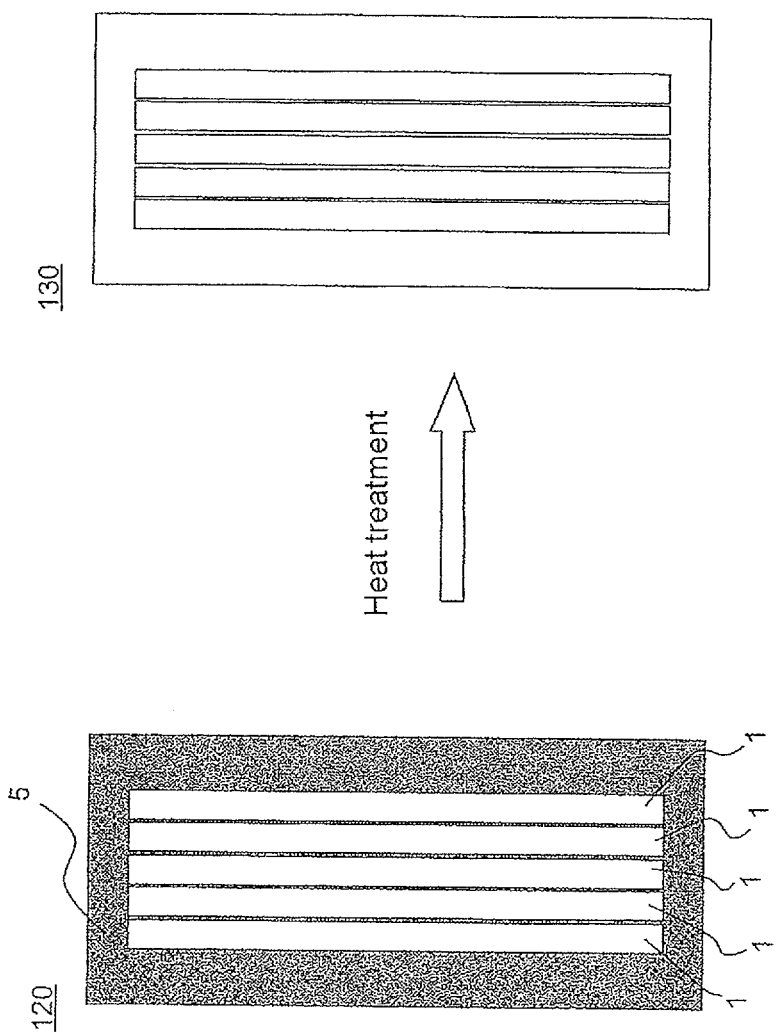

LAYER MATERIAL FOR HIGH-TEMPERATURE USE

The invention relates to a process for producing a composite body having a layer structure, a composite body having a layer structure and the use of such a composite body.

In particular, the invention relates to the processing of melts of glass, metals, semimetals and similar materials at high temperatures of several 100° C. The processing can, for example, comprise the production of a melt of raw material, in the case of glass particularly crushed glass and/or glass batches, and also refining, homogenization and further steps such as passing to shaping. All such process steps involve the use of furnaces and vessels such as crucibles, melt tanks, refining tanks, pipes, stirrers and other apparatuses which have areas which come into contact with the melt during operation.

A material for such components is required to have a high mechanical strength and likewise a high resistance to chemical attack as a result of contact with the melt, i.e. a high corrosion resistance, so that contamination of the melt by introduction of particles of the material does not occur if at all possible.

DE 102 44 040 of the applicant proposes a sintered silica material which has a two-layer structure for glass manufacture. An outer layer of the material for use in contact with a glass melt comprises fused silica grains having a diameter of less than 40 microns. These small fused silica grains are used so that very rapid devitrification of the fused silica with conversion into cristobalite occurs during operation at appropriately high temperatures.

Cristobalite is a crystal modification of $SiO_2$ and offers the advantage of higher corrosion resistance than amorphous fused silica. According to DE 102 44 040, care has to be taken in the production of the material by slip casting of fused silica particles that no or only little cristobalite is formed, since beta-cristobalite is transformed into alpha-cristobalite with a volume decrease of at least 2% at about 270° C. This volume change is considered to be damaging to the component.

According to DE 102 44 040, the sintering process has to be carried out at sufficiently low temperatures in order to largely avoid crystallization. The sintering process is therefore time-consuming.

In addition, in the case of monolithic casting in which a complete block is cast and subsequently has to be dried over a very long period of time, the risk of drying cracks is very high. The cracks make the block unusable. For example, the drying time of a 2 m×2 m×0.3 m block in the case of monolithic casting is about 8 weeks, with the yield being 90%.

It is therefore an object of the invention to provide a material for use at high temperatures of several 100° C. which can be produced simply and quickly. A further object of the invention is to increase the yield in the production of such materials.

Furthermore, it has now been found that there is a need for a material which has still better corrosion resistance, in particular against attack by glass melts.

These objects are, according to the invention, achieved by a process and an apparatus as set forth in the independent claims. Advantageous embodiments are subject matter of the dependent claims in each case.

The invention provides a process for producing a composite body having a layer structure, which comprises the following steps:
 a) provision of at least two plates which each have at least one main area of extension,
 b) stacking of the plates in such a way that a main area of extension of one plate is essentially opposite a main area of extension of the subsequent plate in the stack,
 c) joining of the stacked plates to form a block using a sinterable composition,
 d) carrying out a heat treatment on the block so that at least sintering of the sinterable composition occurs and a strong composite body is formed from the block.

For the purposes of the present invention, the term "plate" refers to a body which has a thickness smaller than its length and width. The area spanned by the length and width is the main area of extension. The other external surfaces of the body will hereinafter also be referred to as end faces. A plate does not have to be flat but merely has to have a shape which allows formation of a stack of a plurality of plates.

The inventors have recognized that the resistance to corrosion on free cast surfaces of a body, e.g. the plates here, is higher. In a composite body composed of a plurality of such plates, there is a sequence of such originally free surfaces. Thus, the corrosion resistance compared to known materials is, according to the invention, increased by the formation of a layer material comprising plates joined to one another on their main surface. Surprisingly, a stable bond between the individual layers and plates can be produced. Porosity and mechanical strength of the material are not disadvantageously altered compared to a monolithically produced material. This is also true of the transition zone between the plates.

The plates can advantageously be kept in stock, so that the coating and joining of the plates then does not involve appreciably more work than production of a monolithic block.

In addition, the cracking behaviour of composite materials or blocks which are produced by the process of the invention is more favourable since the direction of crack growth is changed at the transitions between the layers. This reduces the risk of cracks going all through the body, which can arise during heating of such materials.

Furthermore, the invention offers the advantage that the drying time is significantly shortened. For example, the drying time for a 2 m×2 m×0.3 m block is reduced from about 8 weeks in the case of monolithic casting to only about 3-4 weeks in the case of the plate process of the invention, with the yield also being increased to significantly above 95%.

In the stack formed in step b), the plates can be in direct contact with one another. The dimensions of the intermediate space between adjacent plates are then determined by the nature of the surface on the main areas of extension. However, the plates can also be arranged with a defined distance between one another in the stack.

Steps b) and c) can be carried out simultaneously by firstly applying the sinterable composition to a plate and then bringing the next plate into contact with the sinterable layer. In this case, the spacing of the plates in the stack is defined by the thickness of the layer of sinterable composition.

The invention provides a number of possibilities for joining the plates of the stack to form a block. In an advantageous embodiment of the invention, the sinterable composition for joining the plates is introduced into an intermediate space between two successive plates in the stack in step c). In this way, the plates are adhesively bonded to one another over their area.

In addition or as an alternative, the invention provides for the sinterable composition for joining the plates to be applied in step c) at least to one side of the stack of plates which is abutted by an end face of the plates. In this way, the plates are joined to one another at their end faces. If this occurs on two opposite sides of the stack of plates, the stack is reliably fixed to form a block. In particular, the stack can be surrounded by the sinterable composition on all six external faces. The resulting block is then an encapsulated stack and is also referred to as encapsulated core.

To sinter the composition, the block is fired in step d) in one embodiment of the invention. The firing of the block is advantageously carried out at temperatures in the range above 1000° C., in particular in the range from 1050° C. to 1285° C. In a further embodiment of the invention, the sintering of the composition in step d) can also be carried out during use of the block or composite material. Here, the block or the composite material during use forms at least part of an apparatus which when utilized as intended attains temperatures above 1000° C., in particular above 1200° C.

According to the invention, this temperature range is particularly advantageous when the composition to be sintered comprises silica material since cristobalite crystals are formed in the amorphous fused silica microstructure at the temperatures mentioned.

Surprisingly and contrary to expectations from DE 102 44 04, the layer material is not destroyed by the cooling process after firing even though cristobalite is formed during production of the component. The invention therefore makes it possible to utilize the advantageous properties of cristobalite for increased corrosion resistance.

In this context, reference may be made to the German patent application of the applicant filed on the same day and having the file number of the applicant's representative 06SGL0183DEP (official file number will be advised after receipt), which relates to the sintering of fused silica to produce shaped bodies containing crystalline $SiO_2$. The disclosure in this application relating to production and to the properties of the corresponding sintered fused silica is hereby incorporated by reference into the present application.

In a preferred embodiment of the invention, the plates themselves are produced by a process comprising the following steps:
  aa) provision of fused silica in the form of essentially amorphous $SiO_2$ grains of which not more than 5%, preferably not more than 3%, particularly preferably not more than 2%, have a diameter greater than 15 mm, preferably greater than 10 mm, particularly preferably greater than 6 mm,
  bb) addition of water to the fused silica grains to produce a slip,
  cc) pouring of the slip into a mould which comprises a hollow body having the inverse shape of the plate to be produced,
  dd) drying of the slip to give a plate.

In this way, the invention offers the advantage of better corrosion resistance, in particular towards glass melts, because as a result of crystal formation during production, the transformation of amorphous $SiO_2$ into crystalline $SiO_2$ in later use of the component commences more quickly since crystal nuclei have already been incorporated during production.

In step cc), it is possible to use, for example, a plaster mould. The surfaces of the mould which come into contact with the shaped part can be worked depending on the surface quality requirements for the component to be produced.

In an advantageous embodiment of the process, the plates are subjected to a step
  ee) presintering at a temperature in the range from 500° C. to 700° C.
in order to subject the microstructure to initial strengthening. This can be appropriate particularly when the plates are to be stored until further processing to produce a block. Depending on the external shape of the plate and the stresses, for example due to its own weight, which it can withstand as a result, presintering can also, for example, be carried out in the plaster mould.

To complete formation of the microstructure, the plates are subjected after step cc) and/or after step dd) and/or after step ee) to a step
  ff) sintering.

In particular, the sintering in step ff) is carried out at a sintering temperature at which at least part of the fused silica is transformed from the amorphous modification into a crystalline modification, in particular into beta-cristobalite. Firing of the plates for the purpose of sintering in step ff) can also be carried out after removal from the plaster mould.

In a further advantageous embodiment of the invention, the sintering in step ff) is carried out at a temperature of at least 1080° C., preferably at least 1120° C., more preferably at least 1140° C., particularly preferably at least 1180° C. The high sintering temperature according to the invention enables furnace regulation to be simplified and/or the firing time to be significantly shortened compared to firing at sintering temperatures of not more than 1000° C. In addition, better sintering of the grains of the slip occurs, which results in a reduced residual porosity after firing, a higher density, better mechanical stability and a lower shrinkage due to after-sintering effects during later use of the component.

Depending on the dimensions of the plate or the composite body, the maximum temperature during sintering is, in a preferred embodiment of the invention, selected so that the component attains a homogeneous internal structure as a result of sintering of the fused silica and at the same time crystal formation advantageously occurs to the desired degree in the outer regions. The inventors have found that, for example, a maximum temperature during sintering of about 1285° C. at a maximum wall thickness of the plate of less than or equal to about 85 mm is suitable. At a greater wall thickness of the plate above about 85 mm, this temperature can, for example, be reduced to about 1250° C.

In an embodiment of the invention, the plates are subjected to a step
  gg) cooling to a temperature below 300° C., preferably below 270° C., so that the crystalline $SiO_2$ formed changes its crystal structure without significant crack formation in the plate taking place.

The invention makes it possible for the crystalline $SiO_2$ formed during sintering to be transformed on cooling essentially without damage to the plate, for example as a result of crack formation, since the proportion of crystalline $SiO_2$ formed during sintering is very low. The phase transformation of cristobalite therefore remains essentially without adverse effects on the component as a result of the process of the invention.

In particular, essentially pure fused silica in amorphous form having a content of at least 99.0% by weight, preferably at least 99.5% by weight, particularly preferably at least 99.9% by weight, of $SiO_2$ is, according to the invention, used in step aa). This step is to be viewed in relation to a high sintering temperature at which formation of cristobalite occurs. Cristobalite formation can attain a particular proportion without crack formation occurring as a result of the change in the crystal structure on cooling to below 270° C.

In a preferred embodiment of the invention, the plates, in particular the slip for producing the plates, and the sinterable composition for joining the stacked plates to form a block have an essentially identical chemical composition. This results in a particularly homogeneous composite which has a high mechanical strength and at the same time the high corrosion resistance due to the surfaces of the plates present in the composite.

However, in an advantageous embodiment, the invention also offers the opportunity of varying the thermal conductivity by introducing at least one metal oxide, in particular iron oxide and/or manganese oxide, into at least one plate, in particular the slip for producing the plate. In this way, ceramic blocks having a defined insulating effect can be produced. The addition of iron oxide improves the thermal conductivity and, contrary to expectations, reduces the heat capacity.

For example, at least one core plate having a deliberately high thermal conductivity can be surrounded by a composition which ensures a high emission coefficient. Such plates can react more quickly to temperature changes. This can be achieved, in particular, by means of a core plate having an iron oxide content of 2% and a sinterable composition comprising essentially pure fused silica. Such plates display better tolerance to temperature changes as a result of thermal radiation and are, for example, very well suited as lining material for furnaces.

The invention further provides a composite body, in particular one which can be or has been produced by a process as described above, which has a layer structure having at least two plates positioned opposite one another on their respective main area of extension. In a preferred embodiment, the composite body comprises more than two plates, preferably from two to 10 plates. A plate thickness in the range from 10 millimeters to 100 millimeters has been advantageous for many applications in terms of firing time, mechanical strength, corrosion resistance and outlay for manufacture. However, the thickness of the plates is in principle not subject to any limitations.

In an advantageous embodiment, the composite body has a total thickness of up to 1000 millimeters, preferably up to 500 millimeters, particularly preferably up to 400 millimeters. For example, about 3-5 individual plates are joined together to produce blocks having a total thickness of up to 400 millimeters.

In particular, the invention provides for at least one plate to have a length of up 2500 millimeters, in particular up to 600 millimeters. In a preferred embodiment of the invention, at least one plate has a width of up to 2000 millimeters, in particular up to 600 millimeters. Plates having such dimensions have been found to be suitable for a wide range of applications.

If particularly large blocks are to be produced, these can, according to the invention, be built up from relatively small plates in an advantageously simple manner. Here, the relatively small plates are joined in layers with offset butt joints to form a large block. This is then sintered.

To achieve a particularly high corrosion resistance, in particular towards glass melts, it has been found to be advantageous for at least one plate to comprise sintered silica. In particular, at least one plate can comprise at least 99.0 mol %, preferably at least 99.5 mol %, particularly preferably at least 99.9 mol %, of $SiO_2$. To set the thermal conductivity, the invention provides, in particular, for at least one plate to comprise at least one metal oxide, for example iron oxide and/or manganese oxide.

A further advantage in glass production is obtained when the side of a block which is not in contact with glass in the construction of a melting tank is formed by a plate having an added metal oxide which is not present in the glass composition. If the attrition of the melting tank as a result of glass corrosion proceeds so far that this plate is reached by the glass, the glass is enriched in this metal oxide which is easily detected during continual quality control. This is then the indication that the melting tank has to be renewed. It is thus possible to operate a melting tank without the risk of uncontrolled leakage as a result of glass corrosion.

In a preferred embodiment of the invention, the plates are joined to one another by essentially pure sintered silica which comprises, in particular, at least 99.0 mol %, preferably at least 99.5 mol %, particularly preferably at least 99.9 mol %, of $SiO_2$.

In one embodiment, the invention further provides for at least one plate to have an open porosity of more than 2.5%, preferably in the range from 5% to 25%, particularly preferably in the range from 8% to 12%. The higher the open porosity selected, the more easily can the plates be joined to one another, although the decrease in corrosion resistance accompanying higher porosity has to be taken into account. The plates can advantageously each have, in addition to or as an alternative to the open porosity, a different open porosity, with, in particular, the core plates having a higher open porosity than the outer plates of the composite body.

In an advantageous embodiment of the invention, at least one plate has a contoured surface, in particular with a contour in wave form and/or with rectangular and/or triangular and/or trapezoidal grooves. In particular, the core plates are provided with a surface contour. The contouring of the surfaces also enables the bond between the plates to be improved, in particular as a result of the increased contact area. The contoured surfaces of successive plates are preferably configured in a corresponding fashion so that the surfaces "intermesh".

However, it is also possible to combine plates having a contoured surface with essentially flat plates, so that the contouring acts as spacer when the plates are stacked. This produces a stack having defined dimensions of the intermediate spaces. The sinterable composition for joining the plates over their area is then introduced into the intermediate spaces. As already mentioned above, the set-up of the composite body as a layer material provides for the advantage that the resistance against corrosion is higher at the free surfaces of the casted plates. In a composite body comprising several of such plates, there is a sequence of such initially free surfaces. By the formation of a layer material comprising plates joined to one another on their main surface, the composite body according to the invention shows a higher corrosion resistance against a glass melt compared to a monolith having the same or substantially the same composition and the same geometry.

In other words, the composite body comprises a multitude of plates joined together, whereby the plates have different compositions or preferably the same composition, and whereby the composite body has a higher corrosion resistance compared to a single plate having the same dimensions as the dimensions of the composite body as a whole and the same composition as one of the plates of the composite body.

This even holds in the case of a composite body having plates with different compositions, if composite body is compared to a single plate with the same dimensions and composed of the material having the highest corrosion resistance among the materials of the plates of the composite body.

In other words, if the plates of the composite body differ in their composition, the corrosion resistance of the composite body against a glass melt is higher than the corrosion resistance of a monolith of equal geometry against the same glass melt, whereby the monolith has a composition like one of the plates of the composite body, and whereby this plate has the highest corrosion resistance among the plates of the composite body.

The invention further provides for the use of a composite body as described above as at least part of a crucible and/or a melting tank and/or a refining tank and/or a pipe and/or a stirrer and/or a furnace and/or an apparatus for use in contact with a melt of at least one metal and/or semimetal and/or semiconductor and/or glass.

Figure 2A:
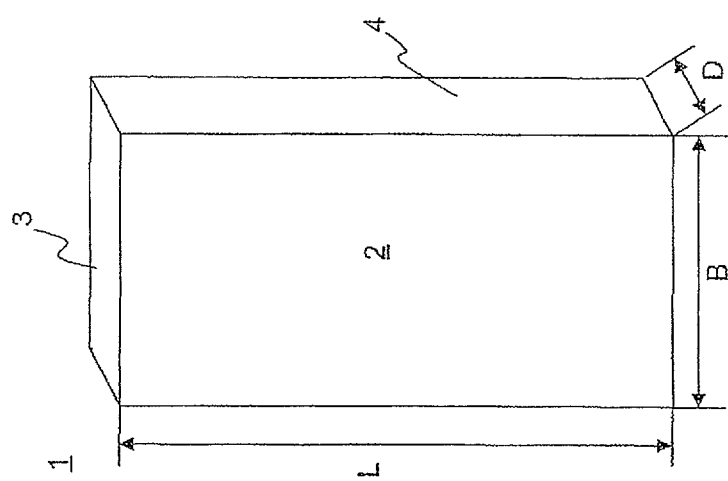
Figure 2B:
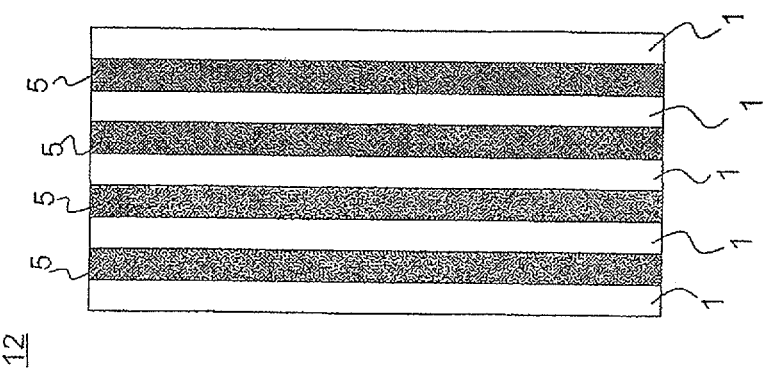
Figure 3:
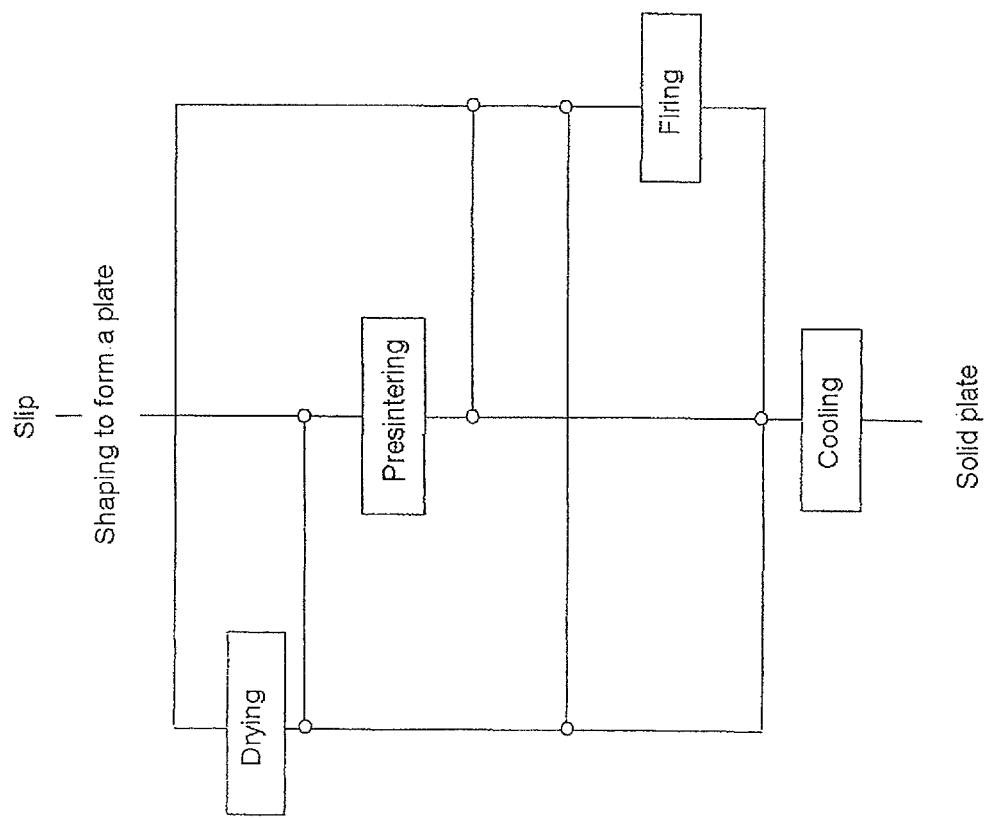
Figure 4:
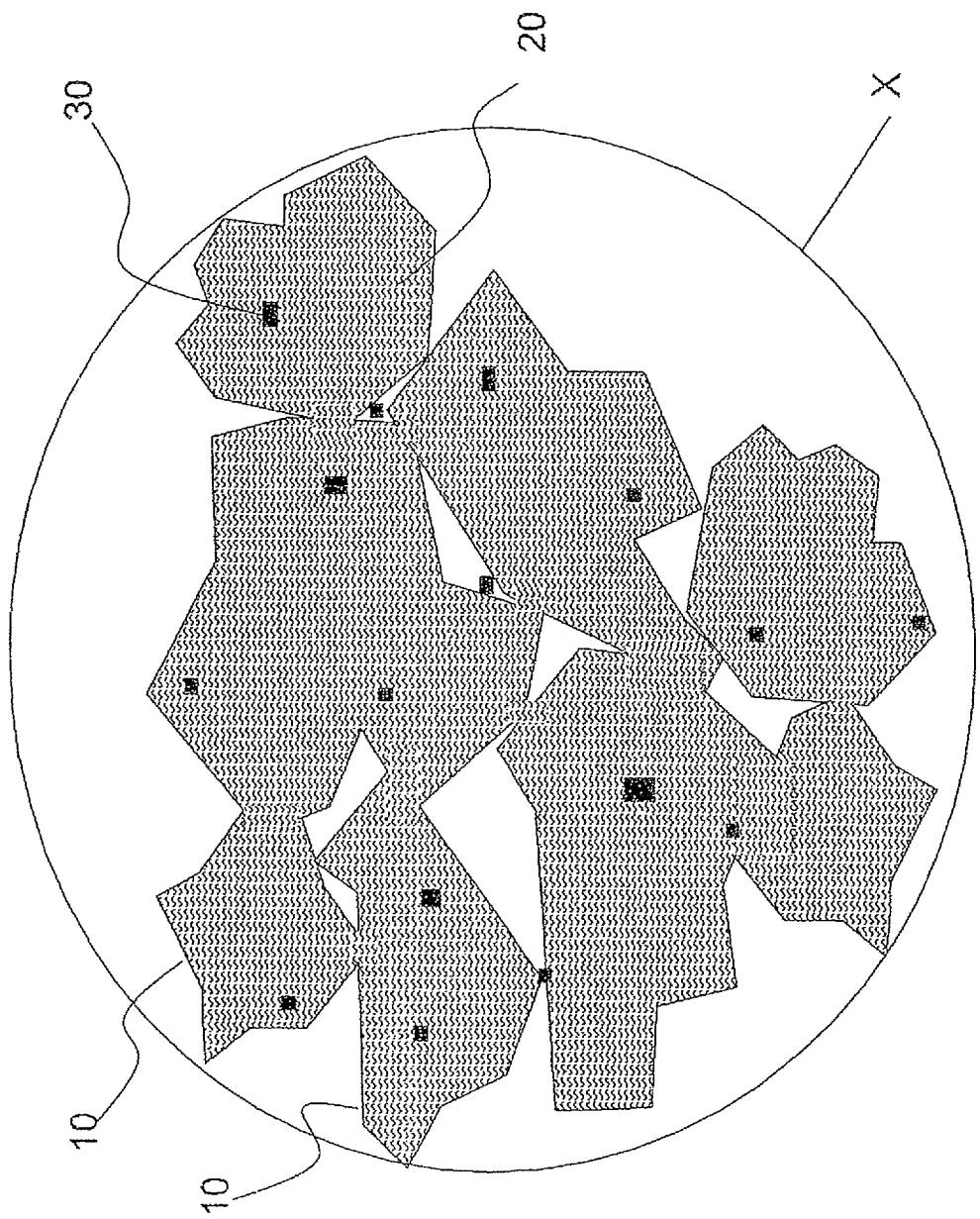
Figure 5:
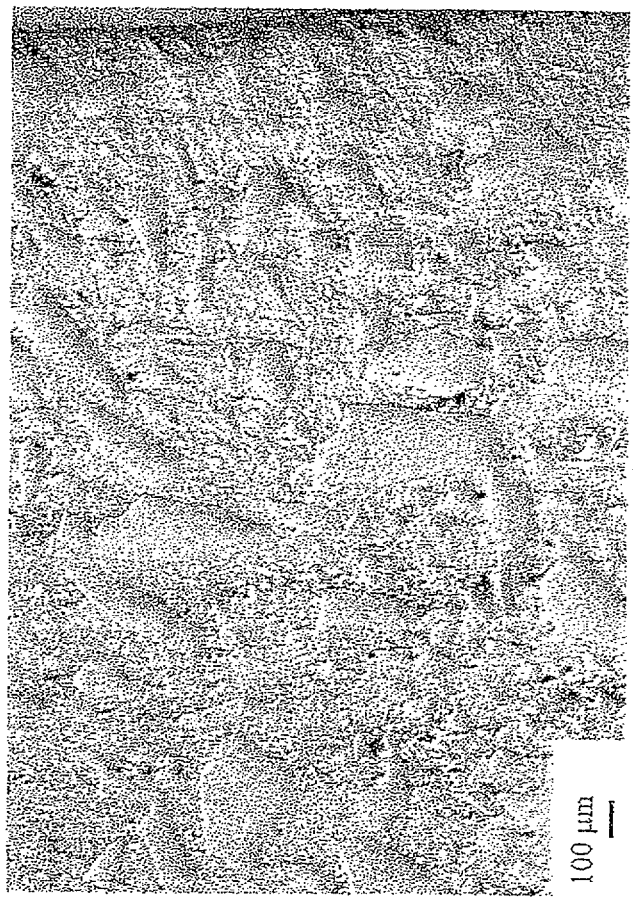
Figure 6:
Figure 7:
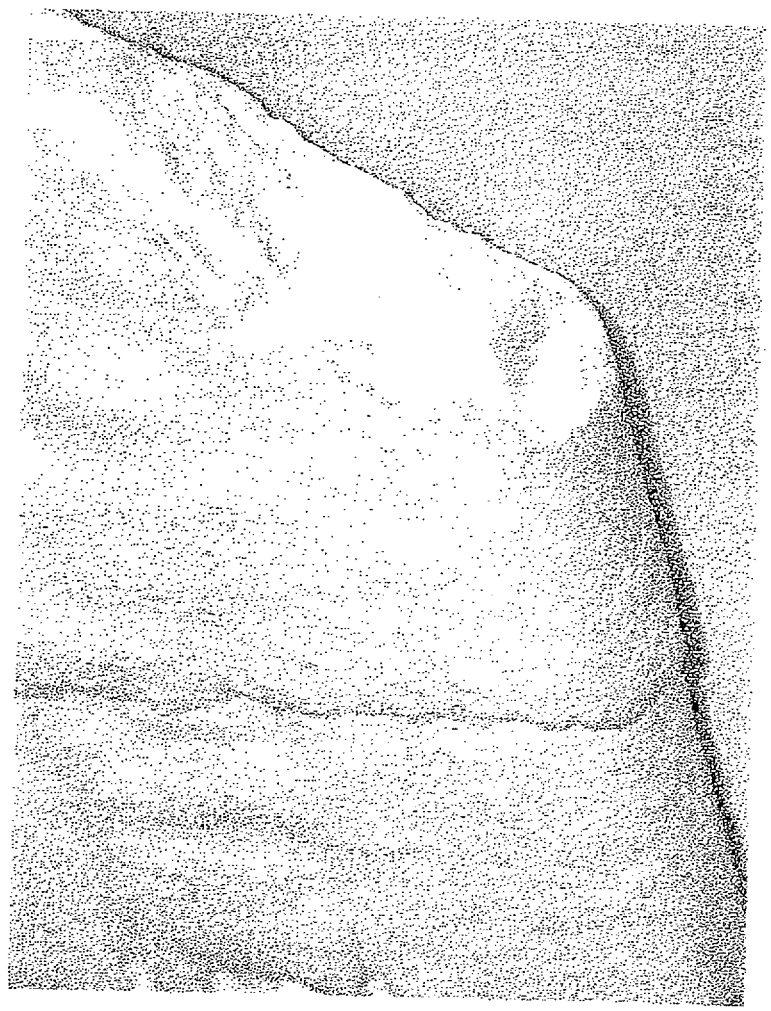

The invention is illustrated below with the aid of examples and with reference to the accompanying drawings. In the drawings:

FIG. 1 shows a schematic flow diagram of the process for producing the composite body, FIG. 2 schematically shows a plate (FIG. 2A) in perspective view, a block according to a first embodiment (FIG. 2B) in cross section and a block according to a second embodiment (FIG. 2C) in cross section, FIG. 3 shows a schematic flow diagram of the process for producing a plate, FIG. 4 schematically shows an enlarged section X of a composite body, FIG. 5 shows a photomicrograph of a polished section from a shaped body having a cristobalite content according to the invention and FIG. 6 shows a photomicrograph of a polished section from a shaped body which has been sintered under conventional temperature conditions, FIG. 7 shows a photograph of a fracture surface of a plate according to the invention.

FIG. 1 shows a flow diagram for the process for producing the composite.

In an embodiment of the process, plates composed of sintered silica and having an open porosity of more than 2.5%, which have been produced by slip casting, are once again bonded to one another or encapsulated by means of the slip which served for producing the plates. The resulting body is fired again, with typical firing temperatures being in the range from 1050° C. to 1285° C.

In a further embodiment of the invention, the block as composite formed by stacking and adhesive bonding of the plates over their area is not fired again. The operating temperatures to which the material is exposed in use, for example in glass production or in the treatment of metal melts, are so high that sintering occurs during the later use. In general, the use temperature is above 1200° C.

Owing to the different shrinkage of the slip casting material which is used for adhesive bonding of the plates relative to the plates which have already been fired, it is advisable to keep the size of the components to be produced appropriately small in order to avoid instabilities in the finished composite. On the basis of the inventors' experience, no adverse effects have become apparent in the case of plates having an edge length of not more than 600 millimeters. This does not rule out the possibility that plates having larger dimensions can also be handled reliably.

FIG. 2A schematically shows a plate. A main area of extension 2 of the plate 1 faces the viewer. The plate 2 also has end faces 3, 4. The plate 2 has a length L, a width B and a thickness D.

The left-hand picture of FIG. 2B shows a cross section of a block 12 according to a first embodiment of the invention. Five plates 1 are arranged in a stack with formation of intermediate spaces. Sinterable composition 5 is present in the intermediate spaces, so that the plates 1 are held together in an essentially compact block 12. This block 12 is subjected to heat treatment, resulting in the composition 5 sintering and a composite 13 (right-hand picture) being formed in this way from the plates 1 which are joined to one another via the composition 5.

The left-hand picture of FIG. 2C shows a cross section of a block 120 according to a second embodiment. Here too, five plates 1 are arranged in a stack. The intermediate spaces between neighbouring plates have a smaller width than in the first example. The stack of plates is encapsulated with sinterable composition 5 so that the plates 1 are likewise held together to form an essentially compact block 120. This block 120 is subjected to heat treatment, with the composition 5 sintering and a composite 130 (right-hand picture) being formed in this way from the plates 1 which are joined to one another via the composition 5.

The gap width of the intermediate spaces between the plates is generally in the range from 10 to 50 millimeters, depending on plate format.

FIG. 3 shows a flow diagram for the process for producing the plates. One possibility is to shape slip to form plates which are fired. The plates can be dried before firing. In addition to or as an alternative to drying, the plates can be presintered before firing.

In a further embodiment of the process, the plates are only dried after slip casting, i.e. not sintered, and then bonded together or encapsulated by means of slip. The block is then fired at a temperature of from 1100° C. to 1200° C., at most 1285° C. Plates having lengths of up to 2500 millimeters and widths of up to 2000 millimeters can be produced in this way.

In a further embodiment of the invention, the plates are presintered at from 500° C. to 700° C. after slip casting and are then assembled and adhesively bonded to form a stack. This is followed by firing.

FIG. 4 schematically shows an enlarged section X of a microstructure formed according to the invention. Both a plate and the sinterable composition for joining the plates, i.e. the composite itself, can have such a microstructure. In the example shown, $SiO_2$ was used for the plates and for the sinterable composition. Grains 10 are joined to one another via sintered bridges to form a strong solid. The grains comprise amorphous fused silica 20. $SiO_2$ crystals 30 are embedded in the microstructure. These can be present in the interior of a grain and/or at places at which grains abut and/or in outer regions of the grains which go over into hollow spaces of the microstructure.

FIG. 5 shows the microstructure after sintering in the temperature range with commencement of cristobalite formation in a polished section. The bulk density of the material is 1.95 g/cm$^3$; its open porosity is 11.0%. The cristobalite content itself cannot be evaluated visually in the polished section. For comparison, the microstructure produced by standard sintering is shown in a polished section in FIG. 6. The bulk density of this material is 1.84 g/cm$^3$; its open porosity is 13.3%.

The plates or the composite have improved corrosion resistance opposite glass melts. Particularly when using $SiO_2$, first formation of cristobalite, which further improves the corrosion resistance in addition to the effects of the layer structure, starts during production, so that the conversion in later use starts more quickly.

To determine the corrosion resistance, the following corrosion test in comparison with borosilicate glass 3.3 was carried out in accordance with ISO 3585 and EN 1595. Glass having the following composition was used:
81% of silica ($SiO_2$),
13% of boric acid ($B_2O_3$),
4% of alkalies ($Na_2O$; $K_2O$) and
2% of other constituents (for example $Al_2O_3$)

In a static corrosion test, specimens of the material of a plate according to the invention are suspended in the glass melt. Both the glass melt and the specimen are kept stationary. The time of the test is 168 hours at a test temperature of 1400° C. After the test time has elapsed, the removal of material from the surface of the specimens is measured in comparison with the dimensions of the specimen at the beginning of the test.

The removal of material from a specimen having a proportion of crystalline $SiO_2$ is significantly lower than in the case of a specimen of conventional material which does not have a proportion of crystalline $SiO_2$ at the beginning of the test. At the temperature of 1400° C., the crystalline $SiO_2$ is present in the form of cristobalite.

The removal of material from a cristobalite-containing specimen is on average 0.77 mm; individual values in the range from 0.71 mm to 0.82 mm were measured. The removal of material from a comparative specimen without a proportion of cristobalite at the commencement of the test is on average 1.05 mm; individual values in the range from 1.0 mm to 1.1 mm were measured.

At the temperature of 1400° C., cristobalite is also formed in the comparative specimen. However, the specimen of the material according to the invention has a proportion of cristobalite at the surface even at the beginning of the test. At the end of the test, the material of both specimens has been converted virtually completely into cristobalite; the residual glass content is less than 10%.

Apart from the increased corrosion resistance, the production process is also simplified by the invention since a higher sintering temperature can be utilized. Since the firing temperature is increased in the production of the components and better sintering can therefore be achieved, the residual porosity is reduced and the density and the mechanical stability of the components are increased.

In addition, the shrinkage during later use as a result of after-sintering effects is lower. If the use temperatures are above the firing temperatures, the material can shrink as a result of the ongoing sintering process. Since a higher overall density or lower residual porosity of the material is achieved according to the invention by means of the production process alone, this shrinkage is significantly reduced in the case of the material according to the invention compared to known materials.

For a material produced using $SiO_2$ and sintered without commencement of cristobalite formation, the shrinkage in later use is in the range from 2.0% to 4%. The shrinkage is very strongly influenced by the particle size distribution of the starting material for production of the slip and by the firing temperature. If the firing temperature is, as described above, made so high that the region of cristobalite formation is reached, the shrinkage can be reduced to 1.0-2.0%.

Example of a Material Having the Following Particle Size Distribution of the Starting Raw Material:

| Proportion [% by weight] | Particle size |
| --- | --- |
| 40 to 60 | less than 0.3 mm |
| 20 to 30 | 0.3 mm to 1.0 mm |
| 20 to 30 | 1.0 mm to 6.0 mm |

In the case of normal sintering without the cristobalite formation zone being reached, the shrinkage is on average from 2.5% to 3%. Sintering with commencement of cristobalite formation enables the shrinkage to be reduced to less than 1.5% (for example to 1.0-1.5%).

The denser presintering also leads to a higher mechanical strength of the material and to a better thermal conductivity. In the case of a material having the abovementioned particle size distribution in the starting raw material, the following values are obtained:

| | Material without cristobalite | Presintered with commencement of cristobalite formation |
| --- | --- | --- |
| Modulus of elasticity (room temperature) [GPa] | 18 | 30 |
| Modulus of elasticity (at 900° C.) [GPa] | 26 | 47 |
| Hot flexural strength (900° C.) [MPa] | 20 | 46 |
| Thermal conductivity [W/mK] at 150° C. | 1.04 | 1.4 |
| Thermal conductivity [W/mK] at 550° C. | 1.24 | 1.6 |
| Density [kg/m³] | 1960 | 2015 |
| Cold flexural strength (room temperature) [MPa] | 14 | 23 |

The values reported are average values derived from a plurality of measurements. Individual values can deviate therefrom. The wall thickness of the body from which the specimens were cut was 40 mm.

FIG. 7 shows a fracture surface of a plate according to the invention. The plate has a layer structure in which the layers are joined to one another or go over into one another in such a way that the fracture runs essentially uniformly through the layers, with deflection of the crack taking place at the transition from the outer layer to the core layer during fracture. The microstructure of the layers, too, does not differ visibly, which is shown by a comparison of the outer region with the core region of the fracture surface.

The invention is not restricted to slip-cast plates. Likewise, the use of sintered silica as starting material is not to be interpreted as a restriction. A person skilled in the art will be able to see that the invention is not restricted to the above-described examples but can be varied in a variety of ways. In particular, the features of the individual examples can also be combined with one another.

List of Reference Numerals
1 plate
2 main area of extension
3, 4 end face
5 sinterable composition
10 grains
12, 120 block
13, 130 composite body
20 fused silica
30 crystals
L length of the plate
B width of the plate
D thickness of the plate

The invention claimed is:

1. A process for producing a composite body of an apparatus that comes into contact with a glass or semiconductor melt, the process comprising:
   a) providing more than two plates, with each plate having at least one main area of extension, wherein at least one of the plates comprises sintered silica, and wherein a plate thickness of at least one of the plates is in the range from 10 mm to 100 mm,
   b) stacking the plates with formation of intermediate spaces in such a way that the main area of extension of one plate is essentially opposite the main area of extension of the subsequent plate in the stack, and wherein a gap width of the intermediate spaces is in the range from 10 mm to 50 mm,
   c) joining the stacked plates to form a block using a sinterable composition, and d) strengthening the block by carrying out a heat treatment on the block so that at least sintering of the sinterable composition occurs, wherein the composite body is formed from the block;

wherein the plates themselves are produced by a process comprising the steps:

aa) providing fused silica in the form of essentially amorphous $SiO_2$ grains of which not more than 5% have a diameter greater than 15 mm, with a particle size distribution of 40 to 60% by weight having a particle size of less than 0.3 mm, 20 to 30% by weight having a particle size from 0.3 mm and 1.0 mm, or 20 to 30% by weight having a particle size from 1.0 to 6.0 mm, bb) adding water to the fused silica grains to produce a slip, cc) pouring the slip into a mould which comprises a hollow body having the inverse shape of the plate to be produced, dd) drying the slip to give a plate; and wherein the plates are subjected after step cc) and/or after step dd) to ff) sintering, wherein the sintering in step ff) is carried out at a sintering temperature at which at least part of the fused silica is transformed from the amorphous modification into a crystalline modification in the temperature range with commencement of cristobalite formation such that the composite body has a microstructure with grains being joined to one another via sintered bridges and comprising amorphous fused silica with $SiO_2$ crystals being embedded in the microstructure, the composite body showing after sintering a bulk density of 1.95 g/cm³ and an open porosity of 11%, wherein the composite body produced by the process comprises a contact surface, and wherein the contact surface of the composite body comes into contact with the glass or semiconductor melt.

2. The process according to claim 1, characterized in that the sinterable composition for joining the plates is introduced into an intermediate space between two successive plates in the stack in step c).

3. The process according to claim 1, characterized in that the sinterable composition for joining the plates is applied in step c) at least to one side of the stack of plates which is abutted by an end face of the plates.

4. The process according to claim 1, characterized in that the block is fired in step d).

5. The process according to claim 1, characterized in that the block is fired at temperatures in the range above 1000° C.

6. The process according to claim 1, characterized in that step d) is carried out during use of the block, with the block in use forming at least part of an apparatus which when used as intended attains temperatures above 1000° C.

7. The process according to claim 1, characterized in that the plates are subjected to ee) presintering at a temperature in the range from 500° C. to 700° C.

8. The process according to claim 7, characterized in that the plates are subjected after step cc) and/or after step dd) and/or after step ee) to the ff) sintering.

9. The process according to claim 8, characterized in that the sintering in step ff) is carried out at a temperature of at least 1080° C.

10. The process according claim 8, characterized in that the maximum temperature during sintering in step ff) is 1285° C. at a maximum wall thickness of the plate of less than or equal to 85 mm.

11. The process according to claim 8, characterized in that the maximum temperature during sintering in step ff) is 1250° C. at a maximum wall thickness of the plate of more than 85 mm.

12. The process according to claim 1, characterized in that the plates are subjected to gg) cooling to a temperature below 300° C. in such a way that the crystalline $SiO_2$ formed changes its crystal structure.

13. The process according to claim 1, characterized in that essentially pure fused silica in amorphous form having an $SiO_2$ content of at least 99.0% by weight is used in step aa).

14. The process according to claim 1, characterized in that the plates and the sinterable composition for joining the stacked plates to form a block have an essentially identical chemical composition.

15. The process according to claim 1, characterized in that at least one plate comprises at least one metal oxide.

16. A process for producing a composite body of an apparatus that comes into contact with a glass or semiconductor melt, the process comprising:

a) providing more than two plates, with each plate having at least one main area of extension, wherein at least one of the plates comprises sintered silica;

b) stacking the plates with formation of intermediate spaces in such a way that the main area of extension of one plate is essentially opposite the main area of extension of the subsequent plate in the stack;

c) joining the stacked plates to form a block using sinterable fused silica grains; and d) strengthening the block by carrying out a heat treatment on the block so that at least sintering of the sinterable composition occurs, wherein the composite body is formed from the block;

wherein the plates themselves are produced by a process comprising the steps:

aa) providing fused silica grains with a particle size distribution of 40 to 60% by weight having a particle size of less than 0.3 mm, 20 to 30% by weight having a particle size from 0.3 mm and 1.0 mm, or 20 to 30% by weight having a particle size from 1.0 to 6.0 mm, bb) adding water to the fused silica grains to produce a slip, cc) pouring the slip into a mould which comprises a hollow body having the inverse shape of the plate to be produced, and dd) drying the slip to give a plate;

wherein the plates are subjected after step cc) or after step dd) to ff) sintering, wherein the sintering in step ff) is carried out at a sintering temperature at which at least part of the fused silica is transformed from the amorphous modification into a crystalline modification in the temperature range with commencement of cristobalite formation, such that the composite body has a microstructure with grains being joined to one another via sintered bridges and comprising amorphous fused silica with $SiO_2$ crystals being embedded in the microstructure;

wherein the composite body produced by the process comprises a contact surface, and wherein the contact surface of the composite body comes into contact with the glass or semiconductor melt.

* * * * *